Dec. 11, 1951     A. SMITH     2,578,376
WHEELED ATTACHMENT FOR BOATS
Filed Nov. 14, 1946     2 SHEETS—SHEET 1
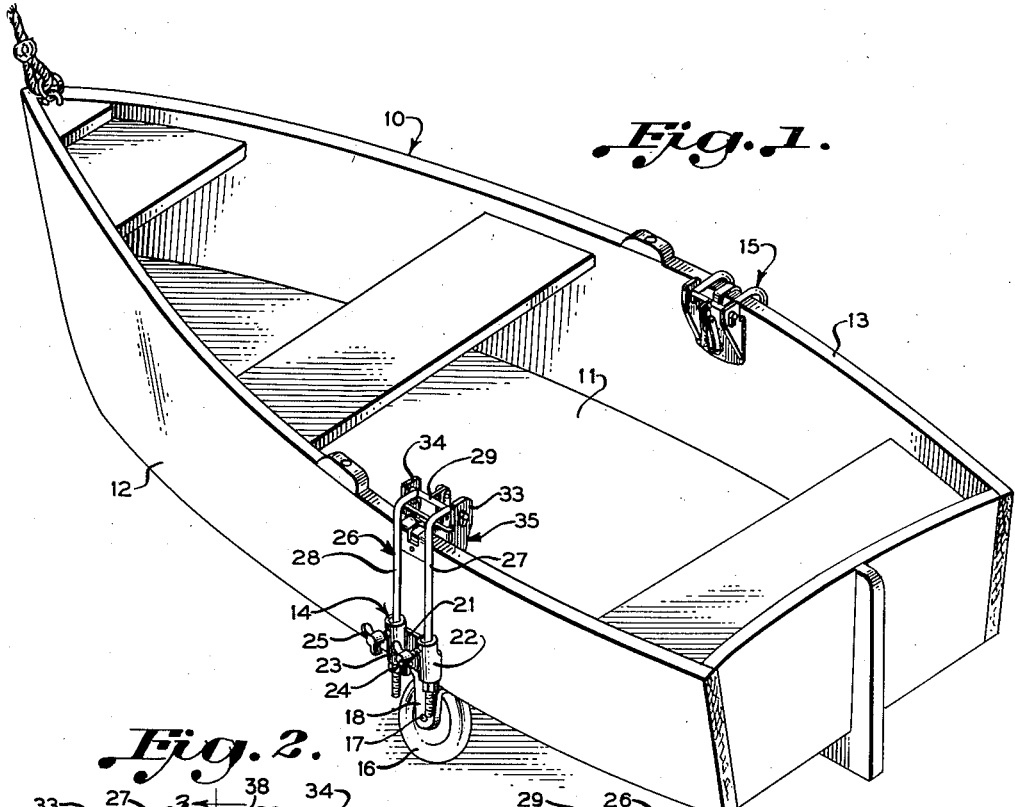
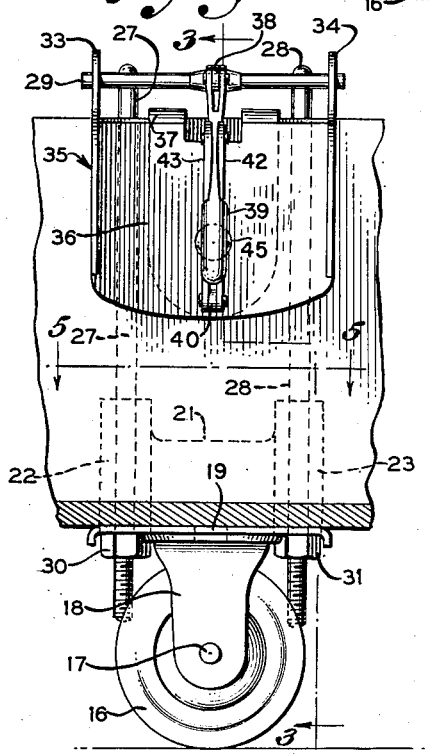
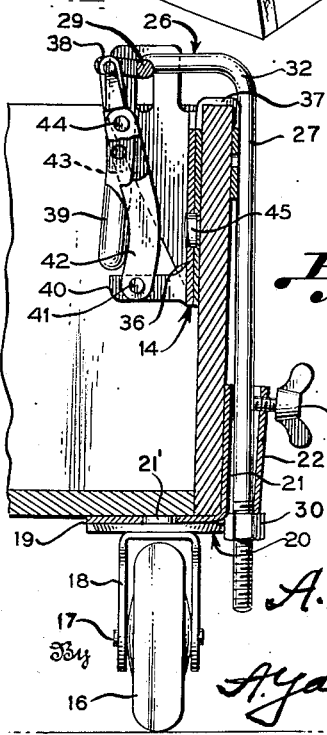

Dec. 11, 1951            A. SMITH            2,578,376
WHEELED ATTACHMENT FOR BOATS
Filed Nov. 14, 1946            2 SHEETS—SHEET 2
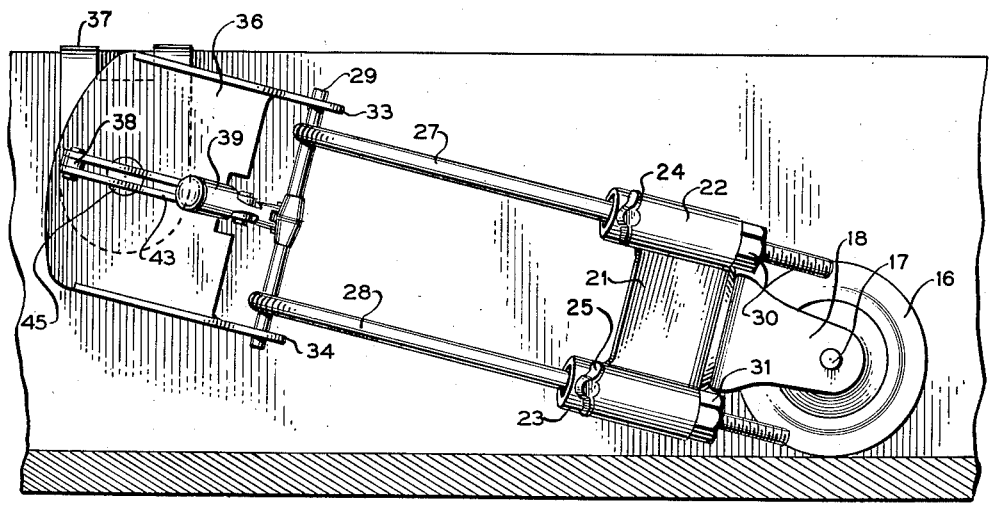
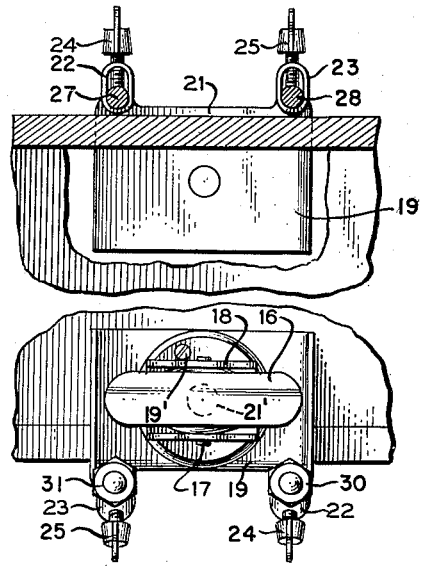
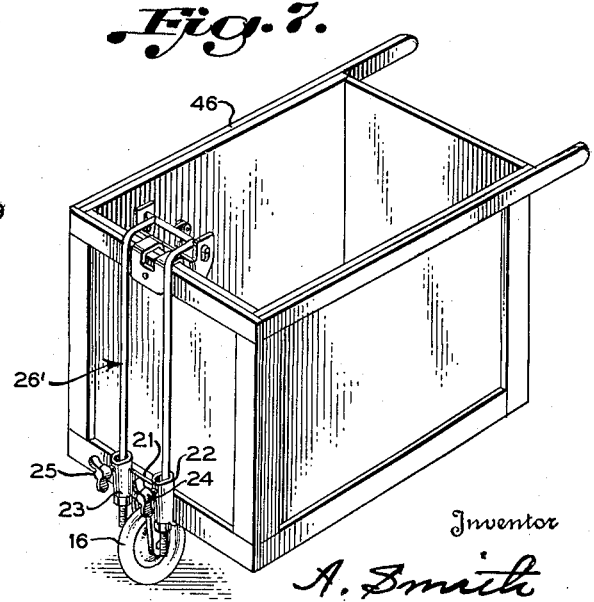
Inventor
A. Smith
By A. Yates Dowell
Attorney Patented Dec. 11, 1951

2,578,376

UNITED STATES PATENT OFFICE 2,578,376

WHEELED ATTACHMENT FOR BOATS

Alexander Smith, Sanford, Fla.

Application November 14, 1946, Serial No. 709,829

3 Claims. (Cl. 280—61)

This invention relates to transportation and more particularly to the conversion of an object which ordinarily is difficult to transport to one which may be easily transported.

The invention is specifically directed to a utility wheel susceptible of application to and removal from an object, ordinarily of a relatively heavy character, desired to be converted for transportation, such as for example a boat, packing case, aircraft or other vehicle or receptacle of any desired shape to provide running gear therefor.

Trucks, rollers and the like employed in the moving of objects not having wheels attached involve inconvenience and expense, as well as other complications in use and transportation, and the devices are not always available when needed and are too expensive to leave permanently attached to the articles supported.

It is therefore an object of the present invention to provide a utility wheel which can be readily attached to and removed from an object or article to be transported and can be disposed either in operative article supporting position or moved to an inoperative position permitting free use of the article or object.

A further object of the invention is the provision of a simple, inexpensive utility wheel, of light weight, and which can be readily applied or removed without modification of the object to which it is adapted to be applied, such as a boat or receptacle, without damage or injury thereto.

A further object of the invention is to provide a utility wheel of few parts so constructed that the device may be readily adjusted and applied to objects of varying sizes and shapes.

Another object of the invention is to provide a utility wheel susceptible of production of few parts, at low cost and with a minimum of skilled labor which is particularly applicable to a small boat and adjustable to facilitate its application so that it may be readily attached to the side of the boat, two of which transform the boat into a trailer and when the boat is placed in the water the utility wheel may be removed or folded into the interior of the boat.

Further objects and advantages of the invention will be apparent from the following specification taken in conjunction with the accompanying drawings, wherein:

Fig. 1 is a perspective of a small boat showing a pair of utility wheels or wheeled supports illustrative of the invention attached thereto;

Fig. 2, an enlarged elevation of a fragmentary portion of one side of the boat showing the manner of attaching the utility wheel or wheeled support thereto;

Fig. 3, a transverse sectional view on the line 3—3 of Fig. 2;

Fig. 4, a view similar to Fig. 2 showing the utility wheel or wheeled support in its inoperative position inside of the boat or receptacle;

Fig. 5, a sectional view of a fragmentary portion of the boat and utility wheel or wheeled support taken on the line 5—5 of Fig. 2;

Fig. 6, a bottom plan view of the utility wheel or wheeled support showing a fragmentary portion of the boat or receptacle to which the device is secured; and Fig. 7, a perspective view of a portable receptacle showing utility wheel or wheeled support illustrative of the invention operatively attached to such a receptacle.

With continued reference to the drawings, a small boat 10 may have the improved utility wheel of the present invention detachably secured thereto. Application of the invention to a boat is merely by way of illustration and not for purposes of limitation, the invention being applicable to other objects.

The boat 10 is open at the top and has a bottom 11 and sides 12 and 13. In order to render the boat easily transportable utility wheels 14 and 15 are attached thereto, one at each side of the boat.

The device includes a wheel 16, preferably comprising a hub portion and a tire of rubber or other suitable resilient material mounted on the hub portion. The tire may be solid or may be a pneumatic tire, as may be desired, depending on the size of the support and the use to which it is to be put. The wheel is on an anxle 17 supported at its ends in suitable apertures provided in the lower ends of the legs of a U-shaped bracket 18. At its upper end the bracket 18 is pivotally secured to the under side of the step portion 19 of a plate member generally indicated at 20. The upper surface of the step portion 19 of the plate constitutes the supporting surface for the article such as the boat 10. The bracket or yoke 18 is rotary relative to the horizontally disposed step portion 19 and is connected thereto by a center pin 21', forming in effect a fifth wheel construction. As illustrated, the lower surface of this step plate may be provided with a circular offset portion providing a bearing surface for the yoke 18. To limit the rotative movement of the yoke with respect to the plate 19, a screw 19' or the like is provided, the head of this screw projecting from the bearing surface and engaging one of the arms of the bracket 18 when the limit of movement is reached. The plate 20 is also provided with a guide portion 21 extending substantially at right angles to the step portion 19 and away from the bracket 18. This guide portion is provided on the outer surface thereof with two integral tubular receptacles 22 and 23. These receptacles are preferably slightly tapered and have their larger ends disposed adjacent the edge of the guide 21 remote from the step 19 and are provided with respective set screws in the form of wing screws 24 and 25.

A U-shaped elongated rod member generally indicated at 26 has two leg portions 27 and 28 joined at corresponding ends by an intermediate portion 29. The leg portions 27 and 28 are externally screw threaded at their ends opposite the ends joined by the intermediate portion 29 and, in the operative assembly, extend through the respective tubular portions 22 and 23 of guide member 21 and are provided with respective nuts 30 and 31 which bear against the bottom ends of the tubular portions of the guide. Near their ends joined by the intermediate member 29 the two legs 27 and 28 have respective right angle bends as indicated at 32 in Fig. 3 to provide end portions which extend across the upper edge of the side of the receptacle when the bracket is mounted on a receptacle in the manner illustrated.

The intermediate member 29 has end extensions received in elongated apertures provided in the legs 33 and 34 of a second bracket member generally indicated at 35 and having a channel shaped cross section. It will be noted in Figs. 2 and 3 that the apertured portions of the legs or flanges 33 and 34 extend above the web portion 36 of bracket 35 and that the lower ends of these leg or flange portions are tapered inwardly toward the web. A flat hook 37 is secured to the outer surface of the web 36 and is dimensioned to closely fit the side, such as the side 12 of the article such as boat 10. The closed end of this hook is substantially flush with the upper edge of the web 36 so that the apertured portions of the flanges 33 and 34 extend above the top of the hook to provide a clearance between the bent over portions of the rod member 26 and the hook.

An apertured lug 38 extends outwardly from the intermediate portion 29 of the U-shaped rod member, preferably near the mid-length location of the portion 29 and a hand-operated lever 39 is pivotally connected at one end to the lug 38. A lug 40 extends outwardly from the lower portion of web 36 immediately below the lug 38 and is provided with an aperture receiving a pin 41 which pivotally connects the lower ends of a pair of link members 42 and 43 to the lug 40. The upper ends of these link members are pivotally connected by a pin 44 to the lever 39 at a location spaced from the pivotal connection of this lever with the lug 38.

When the lever 39 is forced downwardly to the position illustrated in Fig. 3, a force is exerted through the U-shaped rod member 26 between the flat hook 37 and the step portion 19 of bracket 20 tending to pull these two parts together and thus firmly clamp the utility wheel or wheeled support upon the article. When the lever is swung outwardly and upwardly this force is released so that the device may be quickly detached from the article.

Adjustment for variations in the height of the side wall of the article are made by adjusting the nuts 30 and 31 along the screw threaded end portions of the legs of the U-shaped rod member.

In order to facilitate application of the utility wheel to a boat or other article having sides, the angle of which with the vertical varies within reasonable limits, the wing screws 24 and 25 may be adjusted to permit lateral movement of the rods 27 and 28 in the tapered sleeves 22 and 23. This adjustment will permit angular movement of rods 27 and 28 and plate member or angle bracket 20 and thus in effect adjust the camber of the wheel, the plane of which is thus maintained vertical regardless of the angle which the side 12 of the boat or other article makes with the vertical.

The flat hook 37 preferably has a close fit with the side or wall of the article or receptacle so that it will remain in place on the wall until intentionally removed.

With the lever 39 in its released condition and, if necessary, the wing screws 24 and 25 loosened to free the bracket 20 from the under surface of the article, the bracket 20 with the wheel 16 and wheel supporting fork 18 may be swung outwardly and upwardly to a position in which the U-shaped rod member carrying the wheel and bracket 20 is disposed substantially above and within the inner surface of the side of the article. The hook 37 is pivotally secured to the web 36 of bracket 35 by a pin or rivet connection 45 so that the wheel end of the device may then be swung downwardly about this pivotal connection to an inoperative position inside of the article, such as the boat 10, the inoperative position of the device being clearly illustrated in Fig. 4.

In order to accommodate the device to variations in the side or wall height of articles which exceed the length of the screw threaded end portions of the legs of the U-shaped rod member, U-shaped rod members of different length may be provided. The U-shaped rod members may be permanently assembled with the corresponding brackets 35 in which case different devices of varying wall height capacity may be provided or, if desired, the U-shaped rod members may be made detachable from the corresponding brackets 35 so that rod members of different length may be associated with the same utility wheel or wheeled support parts to provide devices of different wall height capacity.

Fig. 7 illustrates a device similar in all respects to the utility wheels or wheeled supports 14 and 15 shown in Figs. 1 to 6, inclusive, and described in detail above, except that the device shown in Fig. 7 is provided with a U-shaped rod member, generally indicated at 26', materially longer than the rod member 26 of utility wheel or wheeled support 14 in order to accommodate the device to the wall height dimensions of a receptacle 46 having walls higher than the sides of the boat 10.

There is thus provided a detachable utility wheel or wheeled support which can be quickly and easily mounted on and removed from an article, which is adjustable to articles of varying dimensions within reasonable limits without changing any of its parts and which may be readily adapted to support articles of widely varying dimensions by the substitution of a single simple and inexpensive part and which may, when desired, be folded from an operative to an inoperative position without completely detaching it from the article. The utility wheel or wheeled support is compact and light in weight so that it may easily be transported or stored and is simple in construction and economical to manufacture and, because of the manner of attachment to an article, can be applied to articles of even large and unwieldy shapes, such as boats, aircraft, et cetera, that could not be placed on a hand truck or other equivalent device now available.

It will be obvious to those skilled in the art that various changes may be made in the invention without departing from the spirit and scope thereof and therefore the invention is not limited by that which is shown in the drawing and described in the specification but only as indicated in the appended claims.

What is claimed is:

1. An auxiliary utility wheel for attachment to a boat to facilitate the transportation thereof comprising a U-shaped hook for embracing a portion of said boat, a U-shaped bracket pivotally mounted on said hook for rotation about a horizontal axis, the legs of said bracket extending above said hook and being provided with opposed aligned vertically disposed slots, elongated rods extending outwardly and downwardly from said bracket, the upper extremities of said rods being mounted within said slots for pivotal and slidable movement in a vertical plane with respect thereto, an angle bracket adjustably secured upon said rods adjacent the lower extremities thereof and including means for adjusting the angular relationship between said angle bracket and said rods, a portion of said angle bracket extending horizontally inwardly and beneath the bottom of said boat, a U-shaped bracket mounted beneath said inwardly extending portion for rotative movement about a vertical axis, a wheel and axle mounted within said last mentioned U-shaped bracket, and toggle means connecting the upper extremities of said elongated rods and said first mentioned U-shaped bracket for moving said first mentioned U-shaped bracket and said angle bracket toward each other to clamp said wheel upon said boat, said elongated rods being swingable about their pivot mountings whereby said rods, angle bracket and wheel may be housed inwardly of said boat in inoperative position.

2. An auxiliary utility wheel for attachment to a boat to facilitate the transportation thereof comprising a U-shaped hook for embracing a portion of said boat, a U-shaped bracket pivotally mounted on said hook for rotation about a horizontal axis, the legs of said bracket extending above said hook and being provided with opposed aligned vertically disposed slots, elongated L-shaped rods extending outwardly and downwardly from said bracket, the upper extremities of said rods being rigidly connected and mounted within said slots for pivotal and slidable movement in a vertical plane with respect to said bracket, an angle bracket adjustably secured upon said rods adjacent the lower extremities thereof and including means for adjusting the angular relationship between said angle bracket and said rods, a portion of said angle bracket extending inwardly and beneath the bottom of said boat, a U-shaped bracket mounted beneath said inwardly extending portion for rotative movement about a vertical axis, a wheel and axle mounted within said last mentioned U-shaped bracket, and toggle means connecting the upper extremities of said elongated rods and said first mentioned U-shaped bracket to move said first mentioned U-shaped bracket and said angle bracket toward each other to clamp said wheel upon said boat, said elongated rods being swingable about their pivotal mounting to an inoperative position whereby said first mentioned U-shaped bracket may be pivoted about its axis to house said rods, angle bracket and wheel inwardly of said boat.

3. An auxiliary utility wheel for attachment to a boat to facilitate the transportation thereof comprising a hook for embracing a portion of said boat, a bracket pivotally mounted on said hook for rotation about a horizontal axis, said bracket being provided with vertically disposed aligned slots, elongated L-shaped rods extending outwardly and downwardly from said bracket, the upper extremities of said rods being rigidly connected and mounted within said slots for pivotal and slidable movement in a vertical plane with respect to said bracket, an angle bracket adjustably secured upon said rods adjacent the lower extremities thereof and including means for adjusting the angular relationship between said angle bracket and said rods, a portion of said angle bracket extending inwardly and beneath the bottom of the boat, a U-shaped bracket mounted beneath said inwardly extending portion for rotative movement about a vertical axis, a wheel and axle mounted within said U-shaped bracket, and toggle means connecting the upper extremities of said elongated rods and said first mentioned bracket to move said first mentioned bracket and said angle bracket toward each other to clamp said wheel upon said boat, said elongated rods being swingable about their pivotal mounting to an inoperative position whereby said first mentioned bracket may be pivoted about its axis to house said rods, angle bracket and wheel inwardly of said boat.

ALEXANDER SMITH.

REFERENCES CITED

The following references are of record in the file of this patent:

UNITED STATES PATENTS

| Number | Name | Date |
| --- | --- | --- |
| 1,303,691 | Tempt | May 13, 1919 |
| 2,171,889 | Payson | Sept. 5, 1939 |
| 2,219,254 | Davis | Oct. 22, 1940 |
| 2,235,034 | Molloy et al. | Mar. 18, 1941 |
| 2,392,786 | Tormollan Jr. | Jan. 8, 1946 |